United States Patent [19]
Sizemore et al.

[11] Patent Number: 5,695,117
[45] Date of Patent: Dec. 9, 1997

[54] EVAPORATIVE AIR CONDITIONING SYSTEM

[76] Inventors: Timothy J. Sizemore, 2064 Silverfield Loop, Redding, Calif. 96002; Bryan L. Redd, 6325 Borg Cir., Ogden, Utah 84403

[21] Appl. No.: 504,509

[22] Filed: Jul. 20, 1995

Related U.S. Application Data

[63] Continuation-in-part of Ser. No. 255,005, Jun. 7, 1994, Pat. No. 5,529,536.

[51] Int. Cl.$^6$ .................. B01F 3/02; G05D 21/00
[52] U.S. Cl. .................. 236/44 A; 62/176.4; 62/309; 261/100
[58] Field of Search .................. 62/171, 176.4, 62/309; 236/44 A, 44 B, 44 E; 165/222, 229

[56] References Cited

U.S. PATENT DOCUMENTS

| | | | |
|---|---|---|---|
| 2,342,841 | 5/1944 | Carraway | 236/44 |
| 2,793,015 | 3/1957 | Thompson | 261/29 |
| 4,272,014 | 6/1981 | Halfpenny et al. | 236/44 B |
| 4,542,851 | 9/1985 | Itou | 165/20 X |
| 4,572,428 | 2/1986 | Groff et al. | 165/20 X |
| 4,643,351 | 2/1987 | Fukamachi et al. | 236/44 E |
| 5,346,128 | 9/1994 | Wacker | |
| 5,463,873 | 11/1995 | Early et al. | 236/44 A X |

*Primary Examiner*—William E. Wayner
*Attorney, Agent, or Firm*—A. Ray Osburn

[57] ABSTRACT

An evaporative device for cooling a stream of air for cooling a space into which the air is discharged. The device includes psychrometric sensors installed in the air stream which provide signals to either an analog or a digital microprocessor control device. The stream of air is cooled by one or more mist nozzles in the incoming air stream, the flow of water to which is controlled through analog or digital control devices, enabling cooling of the stream of air to the maximum permitted by psychrometric relationships without unnecessarily high humidity.

18 Claims, 9 Drawing Sheets

EVAPORATIVE AIR CONDITIONING SYSTEM

RELATED APPLICATIONS

This Application is a continuation-in-part of application, Ser. No. 08/255,005, filed Jun. 7, 1994, now U.S. Pat. No. 5,529,536 having the same inventors, entitled EVAPORATIVE COOLING\HUMIDIFING OF A MOTOR VEHICLES INTERIOR AIR, UTILIZING THE VEHICLES AS DESIGNED POWERED VENTALATION SYSTEM.

BACKGROUND OF THE INVENTION

1. Field

The field of the invention is evaporative air coolers, particularly such coolers that are relatively small but capable of efficiently cooling large volumes of air and are also capable of efficiently cooling warm air in the higher ranges of relative humidity.

2. State of the Art

The principle of evaporative cooling of low humidity air has been exploited for several decades in the drier regions of the United States and other countries. Present evaporative cooling devices typically comprise a low pressure, high volume air mover, such as a squirrel cage fan, mounted within a housing which incorporates large highly porous evaporation pads arranged vertically in its walls. Typically, the evaporation pads are in area four to six times the area of the duct directing the cooled air into the space to be cooled. Loosely woven fibers in the pad are wetted to provide a large surface of water for cooling evaporation. The fan is adapted for delivery of air in high volume and low pressure and the pads are accordingly thin in thickness while extensive in area. The required large pad areas result in impractically large coolers for many applications, such as automobiles, boat cabins, and mobile trailers where the interior space is limited and external mounting of the cooler is not desirable.

So far as is known, all prior art evaporative coolers utilizing evaporation pads require recirculation of unevaporated cooling water from a reservoir upwardly through a pump into an elongate water distribution main positioned along and above the upper edge of each pad. Examples of prior art evaporative coolers working on the above principles are found in U.S. Pat. Nos. 2,497,947 and 4,204,409. U.S. Pat. No. 4,953,831 discloses a variation, in that the incoming air is directed to flow along a passage bordered by the pad rather than directly through it. This increases the saturation of the air before discharge into the space to be cooled. The standard recirculating water approach for wetting the pad is retained, as is the pad construction. This approach increases the dwell time of the incoming air in contact with the pad, which is relatively small, saving space. Another variation is disclosed in co-pending U.S. Pat. No. 5,529,536. A porous flexible pad of plastic fibers is formed into an endless belt, which is powered and directed by rollers to dip into and out of a water reservoir for wetting. The recirculating system is eliminated, but the complication of additional motors and rollers is added. U.S. Pat. No. Re. 31,675 discloses an evaporation pad comprising a number of vertically mounted wicking portions with lower ends immersed in a water reservoir. The incoming air flows between the wetted wicking members. While most evaporative coolers can be somewhat controlled by varying air flow or by water shut off, the latter control cannot be used with the wicking approach.

One prior art embodiment, disclosed in U.S. Pat. No. 2,793,015 utilizes a spray nozzle to inject water from a reservoir into the incoming warm air. The spray may also wet a pad formed into vertical separated wafers, with the incoming air flowing between. A device disclosed in U.S. Pat. No. 2,342,841 discloses the concept of using spray nozzles to introduce water for evaporation. The device includes thermometers and humidistats in the area to be cooled, and a water supplying pump which may be shut off in response to undesirably high humidity in the space to be cooled. Reliance in both is again upon recirculation, which is however provided by the spraying nozzles rather than by pump and drip systems. As with other devices, avoiding excessive entrained droplets in the air stream can only be done by utilizing very low air velocities. Because of this requirement, none of the prior art devices can utilize the air moving fans or blowers of the structure to be cooled. One possible exception is a device disclosed for vehicular application in the aforementioned co-pending application.

A need exists for an efficient evaporative cooling device which can be compactly designed to smaller sizes than presently available, which prevents excessive wetness of the cooled stream of air, which extracts the full cooling potential of the water, and which may be designed to utilize the air movers and air handling ducting of the structure to be cooled.

BRIEF SUMMARY OF THE INVENTION

With the foregoing in mind, the present invention eliminates or substantially alleviates the disadvantages and shortcomings in the prior art devices based on cooling by evaporation. The inventive device utilizes the latent heat of evaporation of water which is introduced into a stream of air desired to be cooled. The flow of the water into the air stream is provided by appropriate valving or pumping devices commanded to operate by analog or digital logic control devices, which process signals from psychrometric sensors installed in the air stream.

In the analog system, sensors are provided having electrical resistances which vary with relative humidity. The resistance output is substantially proportional to the relative humidity over a range of the latter from approximately 80 to 100%. Based upon voltage signals corresponding to the sensor resistances, analog control logic commands the supply of cooling water to the cooling system be continued when the relative humidity is below approximately 95%, or interrupted if above approximately 100%. This is accomplished through control of a relay controlling water injection durations as required to maintain the maximum relative humidity to the desired value of 100%. (Maximum cooling in this example.)

This control function may, if desired, be effected digitally by use of a microprocessor, which is input with signals corresponding to downstream relative humidity, and downstream and upstream temperatures, all derived from appropriate sensors in the air stream. The microprocessor is provided with standard psychrometric data, and with logic for comparing sensor input therewith, thus determining the need or lack of need for injection of water into the air being cooled, and commanding the introduction or withholding of water accordingly.

The water is preferably injected into the air stream as finely divided spray or mist, using appropriate nozzles supplied with a flow of pressurized water. Preferably, the nozzles produce droplet sizes of the coolant water that are small enough to cause substantial portions, ideally all, of the water to evaporate directly into the stream of air, effecting immediate cooling in accordance with psychrometric relationships. However, since such ideal mist cannot in practice be produced, nor distributed uniformly in the air stream, an evaporation pad of water absorbent material is interposed across the stream of air downstream of the mist nozzles. The pad is preferably designed to substantially prevent the passage of any water in unevaporated droplet form, while allowing substantially unimpeded air flow.

Pads of conventional cellulose fiber mat construction may be used, if provided in sufficient thickness and density to have sufficient fiber surface to efficiently collect such droplets. The water of the droplets subsequently enter the air stream in vapor form by evaporation. Another pad construction comprises successive layers of spaced apart thin members of water absorbent material. Successive downstream layers are placed to block openings between the members of the preceding upstream layer. The successive layers provide diversion of all of the air stream, so that substantially all unevaporated droplets are deposited.

Advantageously, a layer of matted metallic filaments is provided abutting the downstream side of the absorbent pad, whatever pad construction is used. This acts to thoroughly mix the absorbent pad effluent air into a stream of uniform temperature and humidity. Fewer downstream sensors are then needed to provide data to the control units which are representative of the entire air stream. The conductive metallic fibers of the pad additionally promote and accelerate exchange of heat between the pad and air stream and between portions of the absorbent pad effluent air stream which may be at different temperatures.

With either analog or digital control, the flow of cooling water is always interrupted when the sensors indicate near approach to 100% relative humidity, or to a lower selected value. This prevents oversaturation of the cooling pad, and also allows less cooling water to be introduced into the air stream, so that both maximum and lower set point levels of cooling may be chosen, which is not possible with prior art evaporative coolers.

The controlled introduction of water prevents overwetting of the pad and eliminates the need for gravity drainage provisions, overflow reservoirs and recirculation pumps. The air ducts and evaporative pads may be positioned without respect to gravity. Because the air velocity through the cooling pad is substantially the same as in the outlet ducts, cooling pads are reduced in size over corresponding prior art systems, so that the inventive system requires much less installation space. Using smaller components and no water stored in the reservoir eliminates much of inefficient heat sink of prior art designs. Because the unit is smaller, it is also more easily insulated to further reduce heat loss.

Other characteristics and advantages of the inventive evaporative cooling system are evident in the following detailed description.

BRIEF DESCRIPTION OF THE DRAWINGS

In the drawings, which represent the best modes currently contemplated for carrying out the invention.

DETAILED DESCRIPTION OF ILLUSTRATED EMBODIMENTS

Figure 1:
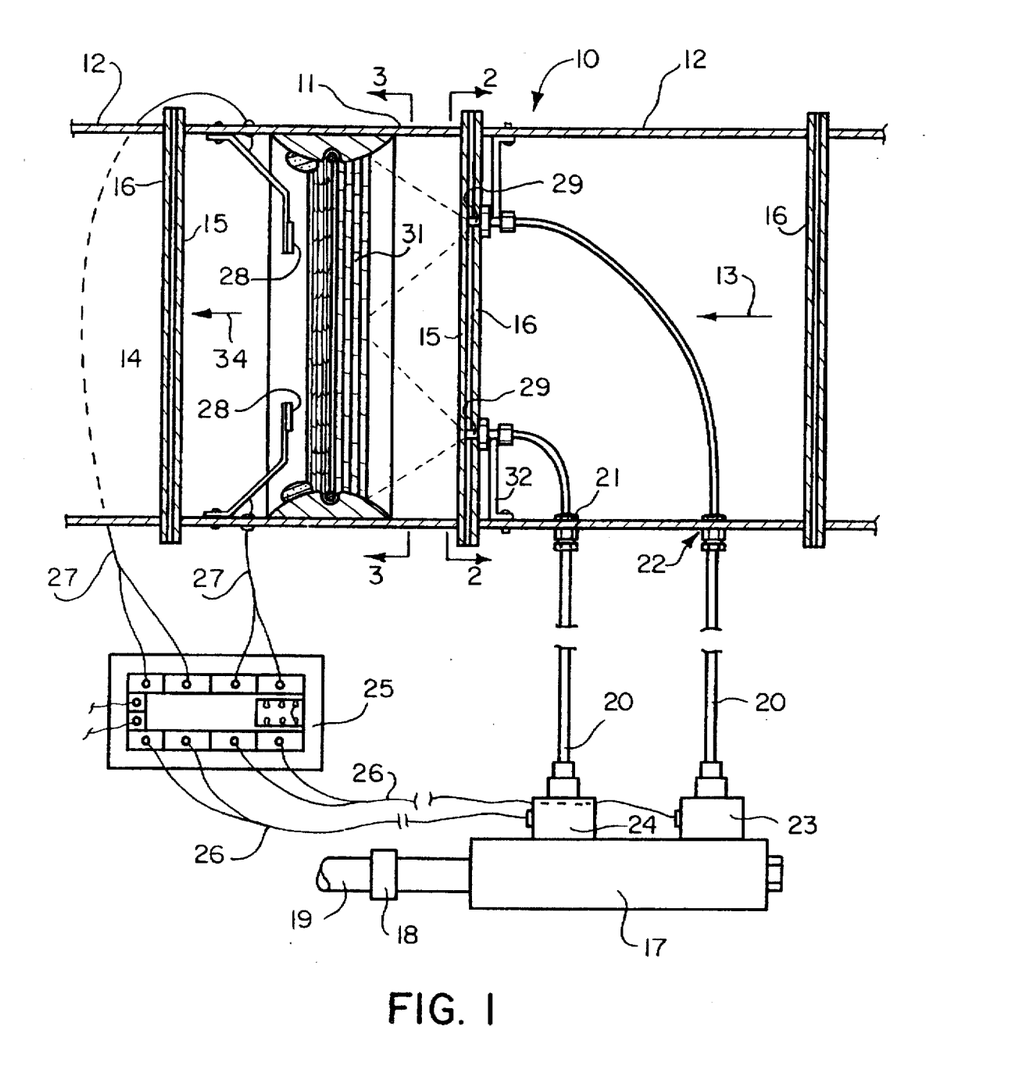
FIG. 1 is a vertical cross sectional view of an evaporative cooler in accordance with the invention, instrumented for analog logic control, and adapted to be installed within the air handling duct work of a structure the interior of which is to be cooled, drawn to a reduced scale, FIG. 2 a cross sectional view of the cooler installation of FIG. 1, taken along line 2—2 thereof, drawn to a slightly larger scale than FIG. 1, FIG. 3 a cross sectional view taken along line 3—3 of FIG. 1, drawn to the same scale as FIG. 2, FIG. 4 a cross sectional view of an evaporative cooler in accordance with the invention, adapted to be installed within the duct work of a building the interior of which is to be cooled, however instrumented for control using a microprocessor, drawn to the scale of FIG. 1, FIG. 5 a front elevation view of the head end of one of the mist nozzles of the invention, drawn to substantially full scale, FIG. 6 a front elevation view of the head end of one of the mist nozzles in accordance with the invention, having a rectangle rather than a circular mist forming orifice, drawn to the scale of FIG. 5, FIG. 7 a representation of the relationship between resistance, percent relative humidity and condensation level of a relative humidity sensors employed in the invention, FIG. 8 a fragment of the evaporative pad asssembly of FIG. 4, drawn to substantially full scale, FIG. 9 a view of a fragment of a sheet of cellulose paper employed in the evaporative pad construction process, indicating the slits therethrough, drawn to substantially full scale, FIG. 10 a view of a fragment of a slitted cellulose sheet expanded to provide openings and deposition surfaces within the evaporation pad, drawn to substantially full scale.

An embodiment of the evaporative air cooler 10 in accordance with the invention is illustrated in FIG. 1 installed within a housing 11 sized to fit into an air handling duct 12 through which ambient air 13 enters a space 14. Housing 11 may be secured to duct 12 as by mating flanges 15 and 16. Duct 12 may be in some instances be installed to admit air into the structure. In others, existing air ducting for heating or air conditioning within the structure may be utilized. A water supply valve assembly 17 is connected through a water filter 18 to a water supply through an inlet water pipe 19. In other installations, water may be supplied through appropriate pumps, not shown. Valve assembly 17 delivers water to cooling unit 10 through flexible inlet tubing 20 of ¼" O.D. polyethylene tubing, for example, entering housing 11 via grommets 21, sealing perforations 22. Flow through the two water inlet tubes 20 is controlled by solenoid operated valves 23 and 24.

An analog control card 25, such as Model No. HCL-120 manufactured by Ohmic Instruments Company of Easton, Md., provides electrical energy through output leads 26 to operate the solenoids to allow or to prevent flow of water into cooling unit 10. Control card 25 incorporates analog circuitry which acts in response to data received through leads 27 from downstream relative humidity/condensation sensors 28, such as Model HCS also available from Ohmic Instruments.

Figure 2:
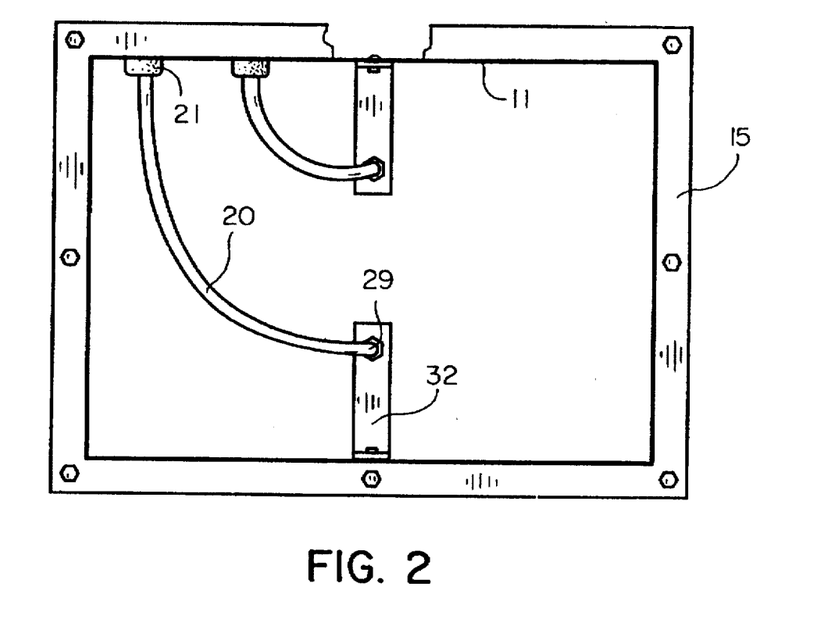
Figure 5:
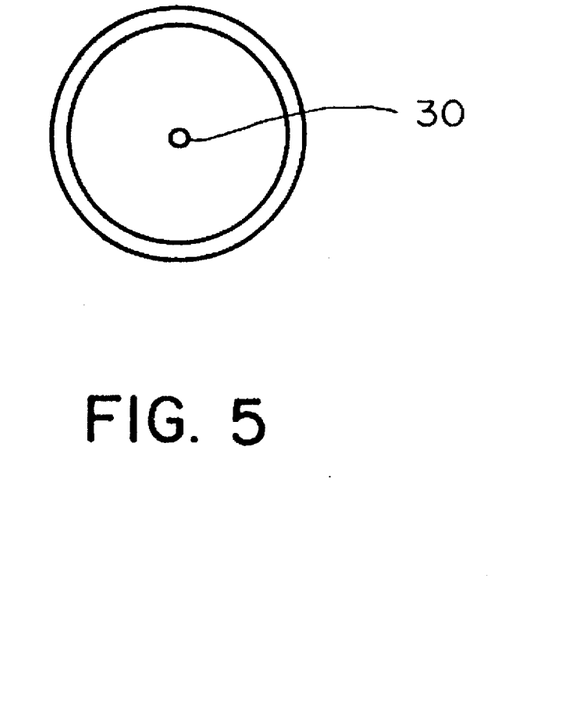
Figure 6:
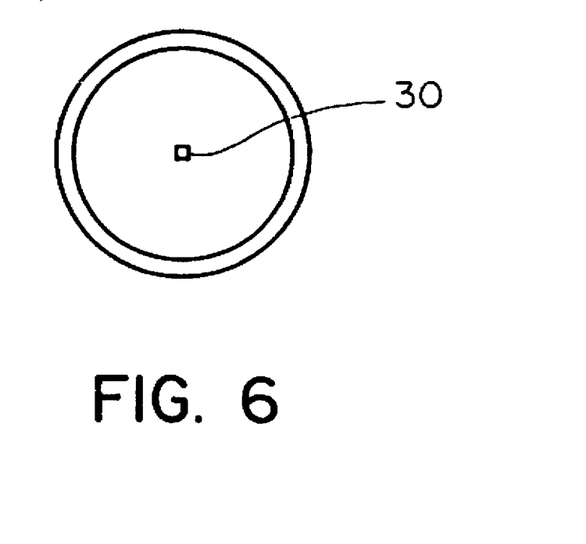
Figure 7:
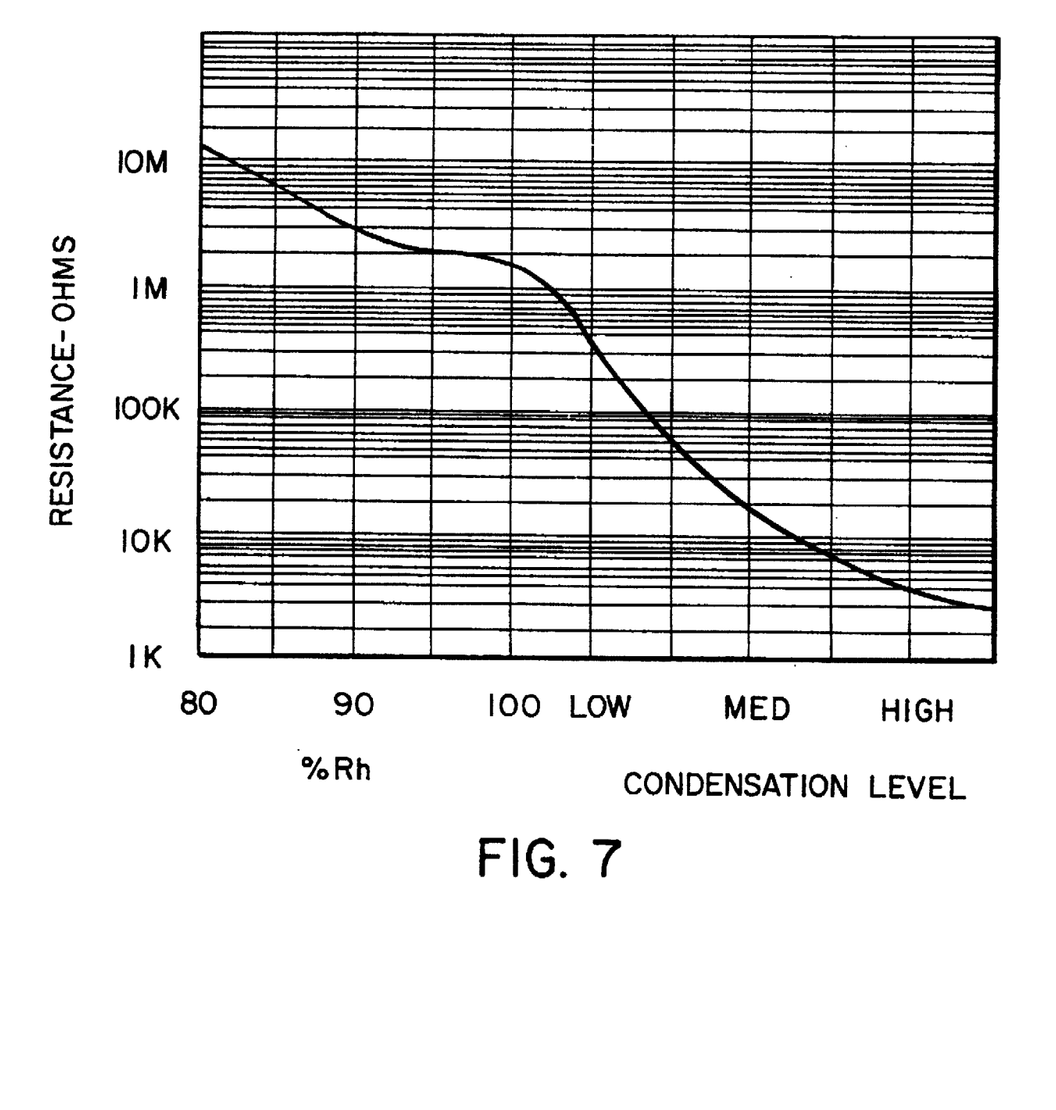

Inside housing 11 are mounted a pair of nozzles 29 for producing a finely divided mist of the water supplied through inlet tubes 20. (FIGS. 1 and 2) Nozzles 29 are situated so as to emit the mist in three dimensional conical patterns, distributed across housing duct 11. Nozzles 29 comprise an exit orifice 30 about 0.030 inches in diameter. Orifice 30 may however be shaped as needed to provide uniformly distributed mist impingement upon an evaporation pad 31, which is interposed across housing 11. (FIGS. 5 and 6) Mist nozzles 29 may be obtained from Bete Corporation of Greenfield, Mass. Brackets 32 support nozzles 29 from the walls of housing 11.

Figure 3:
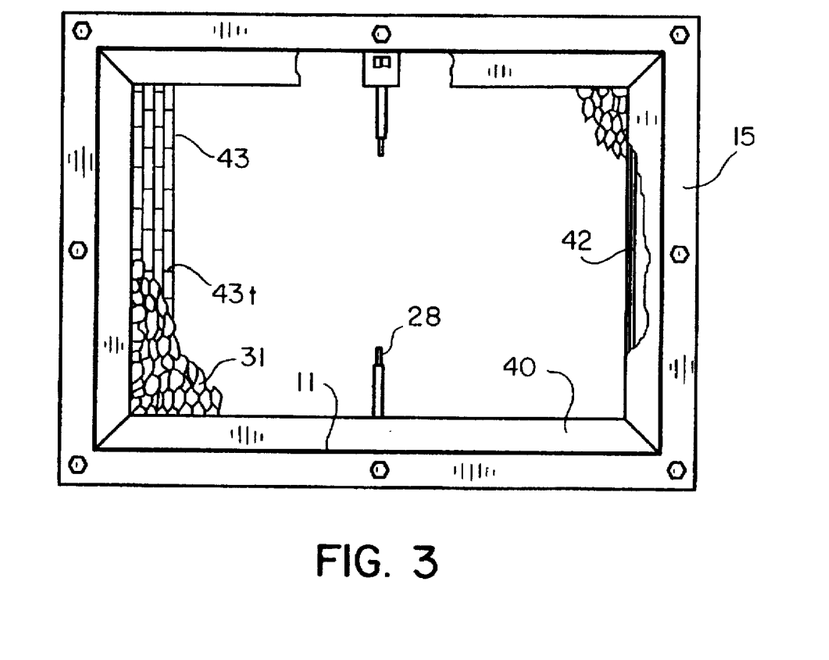

Sensors 28 (FIGS. 1 and 3) experience changes in electrical resistance with changes in relative humidity of the downstream cooled air. (FIG. 6) Condensation occurring upon sensors 28 above 100% relative humidity produces similar changes. However, the wetness of the air in the condensation range is generally undesirable for evaporative cooling, so that the condensation range is avoided for control of cooler 10. As subsequently discussed, care is taken to prevent any water droplets from penetrating pad 31 to impinge upon the sensors 28, to avoid spurious indications of relative humidity. Since maximum evaporative cooling occurs when 100% relative humidity is reached, the repeatability of the relationship between about 80% and 100% relative humidity enables the use of simple analog circuitry to control the injection of cooling water.

In operation, voltage signals corresponding to the electrical resistances of relative humidity sensors 28 are received by a control card 25 through electrical leads 27. The electrical resistances of sensors 28 vary inversely with the relative humidity of the air emerging from the downstream side of the evaporation pad 31, as discussed above. Higher relative humidity is associated with lower sensible temperatures. Control card 25 is designed to monitor the relative humidity as water is misted into the air stream until it increases to a desired value. Generally, 100% is desired, for maximum cooling. When this or any lower control relative humidity is reached, card 25 commands solenoid valves 23 and 24 to interrupt the flow of water through the mist nozzles 29. Subsequent drop in sensed relative humidity to about 95% causes resumption of cooling water flow by command from control card 25.

For successful accurate operation of relative humidity sensors 28, deposition thereon of liquid water droplets from the mist must be prevented. Such droplets are not from condensation, but may effect the output sensor in the same manner as actual condensation, causing spurious sensor output. The downstream air 34 must be substantially free of such droplets which in fact exist among the droplet distribution of the mist nozzles 29, and survive for significant periods even in air of low humidity.

Evaporation pad 31 may be of various constructions to preclude entry of such mist droplets into the downstream air 34. However, the selected construction must divert the incoming air to follow a torturous path. The entrained droplets, propelled by momentum, cannot negotiate the curving and bending air path, and are deposited within the pad. Immediate and rapid absorption of the impinged, droplets assures that none survive. Subsequently, the water previously constituting the droplets evaporates directly into the continuing air stream 13 as a vapor.

Figure 8:
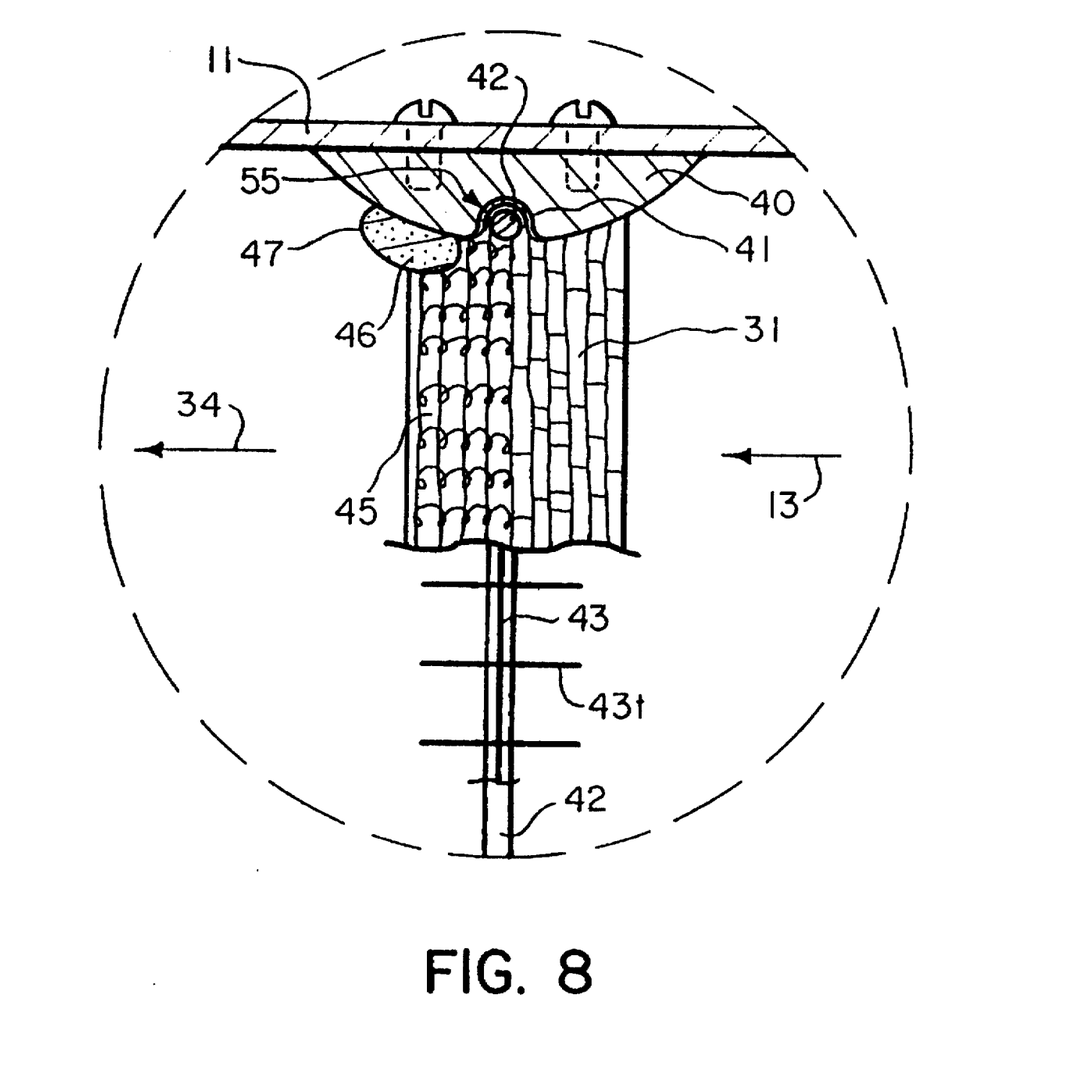
Figure 9:
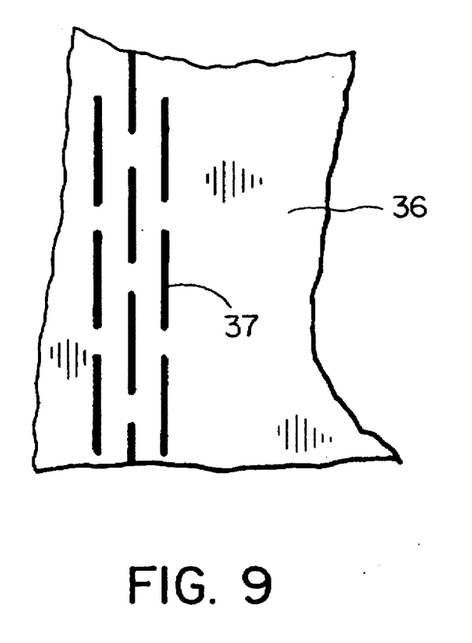
Figure 10:
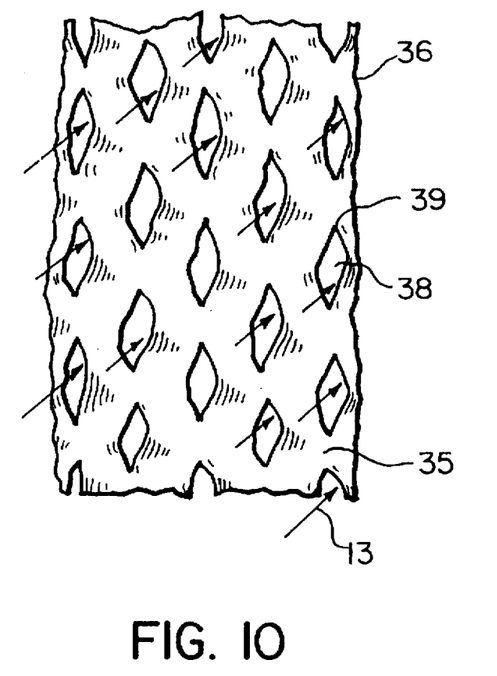

Evaporation pad 31 may be of alternate forms so long as the air flow is forced to change direction as discussed above. A presently preferred embodiment is illustrated in FIGS. 8–10. Sheets 36 of cellulose paper are provided with alternately staggered rows of slits 37 (FIG. 9), then stretched perpendicularly to the rows of slits. This opens the slits 37, providing openings 38 for air flow, and twisting the strips 39 between the slits to form the inclined droplet deposition surfaces. The edges of stretched sheets 36 are secured to a frame and seal 40, as by potting material 41, each sheet positioned with deposition surfaces 35 placed to span across openings 38 of the next preceding upstream stretched sheet 36. Sufficient successive sheets 36 are provided to completely block any air flow path directly through pad 31.

The sheets 36 may be further supported by one or more metallic open mesh sheets 43, secured to a heavy wire frame 42. Mesh sheets 43 support the sheets 36 against the pressure of incoming air 13, and against sagging from gravity in horizontal pad installations. An open mesh metallic member 43, also has a number of wire segments severed and bent to form supporting tines 43t. Heavy wire frame 42 snaps into groove 55 in frame 40 for primary pad support.

In addition to absorbent pad 31, it is advantageous to provide an abutting downstream layer 45 of metallic filament matting, also supported by open mesh 43, serving to more thoroughly mix and exchange heat to the emergent air. More uniform temperature also results from the conductivity of the metallic filaments. Both the mechanical mixing and heat exchange functions of mat 45 improve the uniformity of humidity and temperature of the stream flowing over the sensors 28, the output of which is accordingly more accurately indicative of the need to continue, interrupt, or commence injection of upstream water. Local variations of temperature humidity and velocity of the air across pad 31 result from local non-uniformities in pad construction, and in velocity and temperature across duct 12, as well as from variations in mist distribution. A peripheral absorbent felt member 46 contained within muslin mesh 47 is preferably provided around the filament pad 45 to prevent any edge accumulation of water from being entrained unevaporated into downstream air 34.

Figure 4:
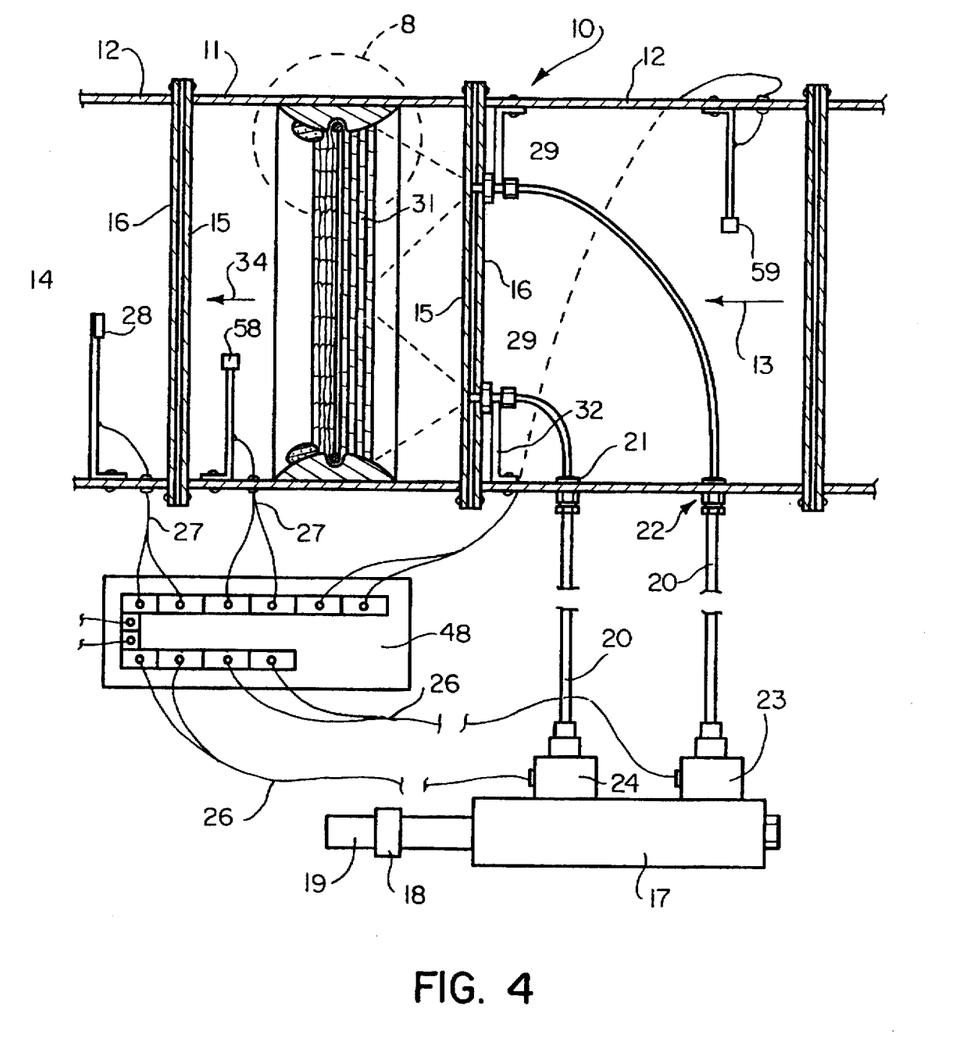

Evaporative cooling device 10 may be designed for digital, rather than analog, control. A microprocessor 48 is programmed to operate in response to the output from relative humidity sensors 28, a downstream air temperature sensor 58 and ambient or intake air temperature sensor 59 on the upstream side of mist nozzles 29. (FIG. 4) Microprocessor 48 has stored standard psychrometric data. The microprocessor logic in effect plots sensed downstream relative humidity and temperature upon a graph of standard psychrometric relationships between relative humidity, air pressure and air temperature, to determine whether a change in relative humidity would result in a decrease or an increase in downstream temperature. If increased relative humidity is needed to drive the downstream temperature towards a target level, microprocessor 48 commands the valves 23 and 24 to continue the flow of water to nozzles 29, for example.

Figure 11:
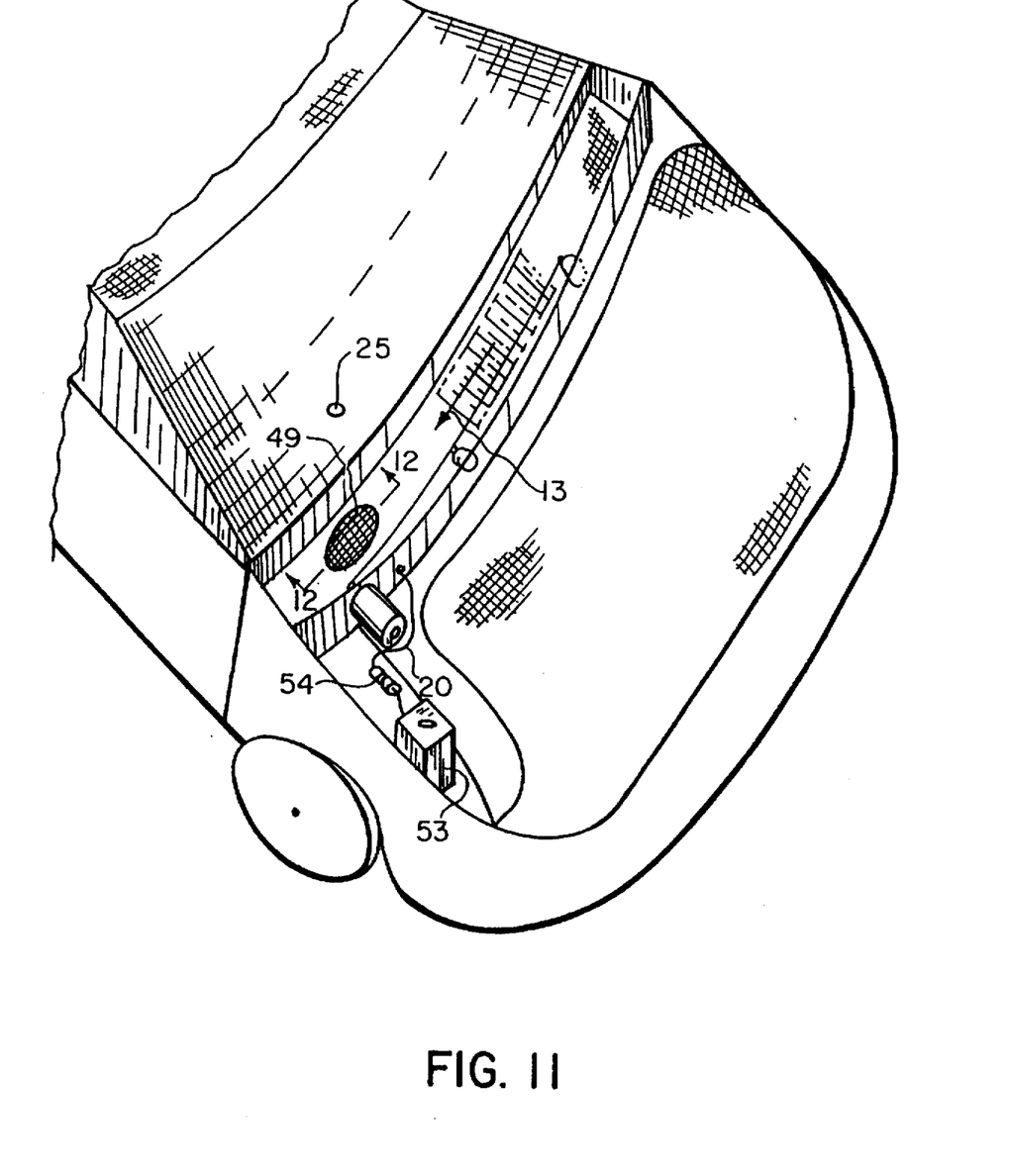
FIG. 11 a perspective view of a fragment of a motorized vehicle cut away to show the outside air inlet and indicating the vehicle carried blower and a water reservoir tank, drawn to a reduced scale, and FIG. 12 a vertical cross sectional view of a vehicle evaporative cooler installation in accordance with the invention, showing the upstream mist nozzle, the evaporation pad structure and the downstream relative humidity sensor used to control the system by providing signals to an analog logic card.
Figure 12:
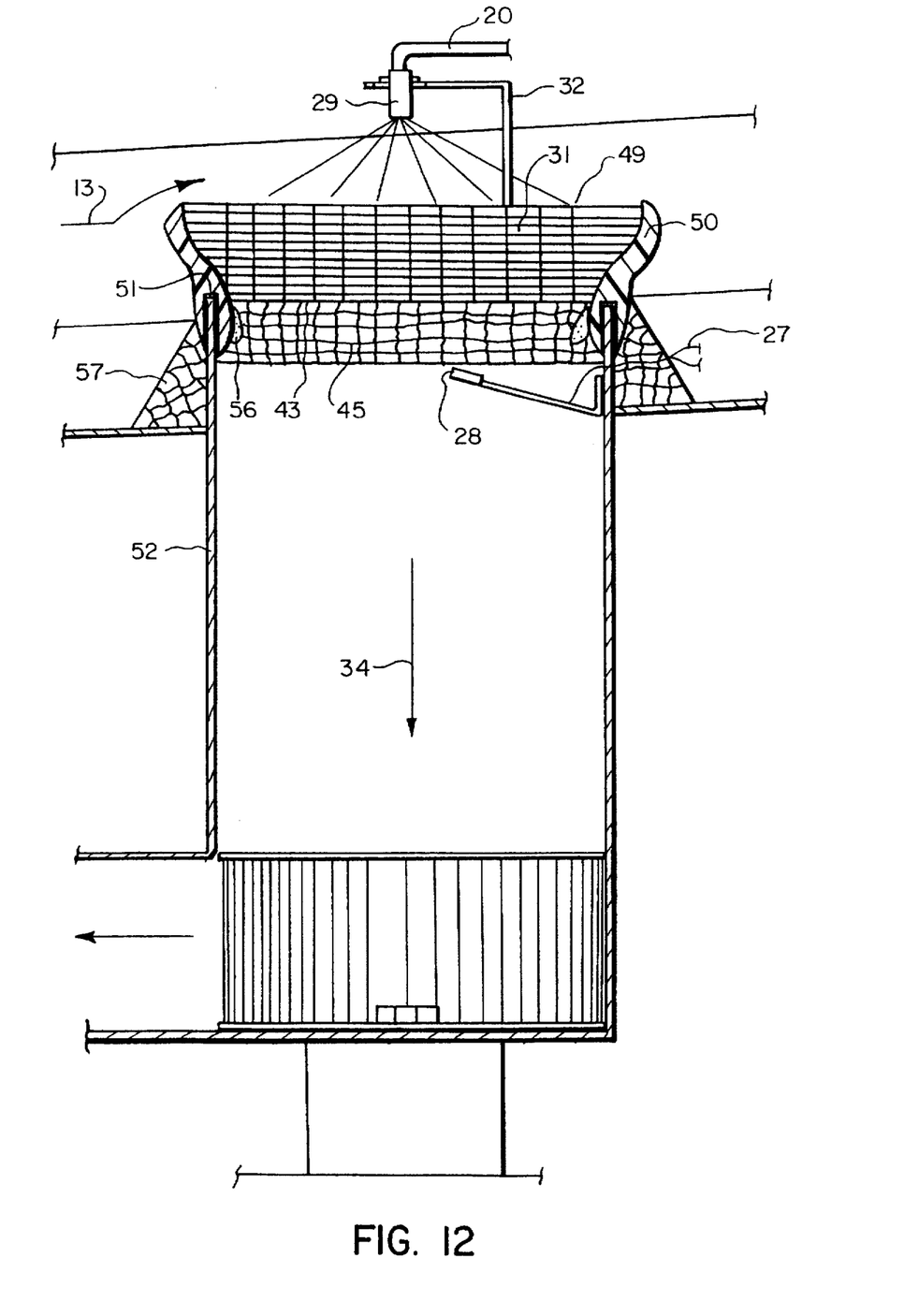

The same operational principles discussed above apply also to cooling units 10 for the interior of automobiles, trucks, trailers and boats. For automobile application an evaporative pad assembly 49 is installed, employing a preferably elastic seal 50 upon the outside air inlet 51 to the internal ducting 52 of the vehicle. (FIGS. 11 and 12) A water reservoir tank 53 supplies the mist nozzles 29 with water through a control pump 54. As with building systems 10, either analog or digital control (not illustrated for vehicular application) may be used. Pad 49 incorporates an absorbent layer 31 and a metallic filament layer 45, as discussed above. An edge drip collector 56 of felt is preferably provided, as is a plastic foam insulating collar 57 about air intake 51. A downstream relative humidity/condensation sensor 28 provides input to an analog control card 25 mounted in the vehicle passenger or driver compartment.

The inventive apparatus may be embodied in other specific forms, and the method in other specific steps, without departing from the spirit or essential characteristics of either. For example, other means than the mist nozzles could conceivably be employed to introduce water into the stream of air to be cooled, such as drip wetting or pad dipping methods and apparatus. Nor is the evaporative cooling installation necessarily adapted for cooling incoming air from outside a building structure or vehicle. Rather, recirculated air may also be processed, and the system can be controlled to serve as a humidifier for internal air, all based on the same principles of operation. The evaporative cooling device 10 may be used in conjunction with refrigerated air conventional central systems, providing pre-cooling or even alternate switching between cooling systems. The presently illustrated and discussed apparatus and method are therefore to be considered illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A method of conditioning a moving stream of air comprising the steps:

providing duct means to direct the stream of air to prevent undesired mixing of the air of the stream with ambient air;

providing means for introducing water into the stream;

continuously monitoring the psychrometric conditions within the stream by placing at least one signal producing psychrometric sensor downstream of the water introducing means;

providing means to continuously analyze the psychrometric conditions and using said means to determine whether to add water to the stream to urge psychrometric conditions therein towards a target value;

providing means commanding the water introduction means to operate;

introducing water into the stream in accordance with the continuing analysis of psychrometric conditions; wherein the psychrometric sensors comprise a relative humidity sensor which varies in electrical resistance in accordance with variations in relative humidity; and the means for analyzing the psychrometric conditions comprises an analog logic circuit acting in response to electrical voltage values corresponding to the electrical resistance of the relative humidity sensor; said method comprising the further step providing an air permeable water evaporation pad extending across the duct downstream of the spray nozzle and upstream of any downstream psychrometric condition sensor.

2. The air conditioning method of claim 1, wherein the evaporation pad comprises:

at least two successive layers comprising a multiplicity of spaced apart members of thin water absorbent sheet material, the layers extending vertically and horizontally across the interior of the duct means, successive layers along the duct means each being closely adjacent an immediately preceding layer and being installed in a position wherein the sheet members thereof are placed to at least partially block the spaces between the members of said immediately preceding layer; wherein the sheet members of the successive layers completely block the spaces between the sheet members of the first of the successive layers of sheet members longitudinally to the duct.

3. The air conditioning method of claim 2, wherein each successive layer of spaced apart sheet members comprises:

a sheet of thin water absorbent material having a multiplicity of rows of slits of equal length therethrough, the slits spaced apart longitudinally at equal distances end to end, said rows being parallel and spaced apart, the slits of successive rows being laterally aligned with the spaces between the slits of the next preceding row, the slits being substantially longer than the spaces therebetween; wherein said strip is stretched in the direction lateral to the rows of slits forming the sheet into the sheet members and openings therebetween.

4. The air conditioning method of claim 3, wherein the evaporation pad further comprises:

a mat of metallic filaments abutting the downstream layers of sheet members.

5. The air conditioning method of claim 2, wherein the evaporation pad further comprises:

a mat of metallic filaments abutting the downstream layer of sheet members.

6. The air conditioning method of claim 5, wherein:

the duct means comprises the outside air inlet ducting of a motorized vehicle.

7. The air conditioning method of claim 2, wherein:

the duct means comprises the outside air inlet ducting of a motorized vehicle.

8. The air conditioning method of claim 1, wherein the evaporation pad comprises:

a mat of water absorbent fibers.

9. The air conditioning method of claim 8, wherein the evaporation pad further comprises:

a mat of metallic filaments abutting the downstream side of the mat of water absorbent fibers.

10. The air conditioning method of claim 9, wherein the duct means comprises the outside air inlet ducting of a motorized vehicle.

11. The air conditioning method of claim 8, wherein:

the duct means comprises the outside air inlet ducting of a motorized vehicle.

12. The air conditioning method of claim 1, wherein:

the duct mean comprises the outside air inlet ducting of a motorized vehicle.

13. A method of conditioning a moving stream of air comprising the steps:

directing the stream of air to prevent undesired mixing of the air of the stream with ambient air;

continuously monitoring the psychrometric conditions within the stream;

continuously analyzing psychrometric conditions of the stream to determine whether to add water to the stream to urge at least one psychrometric condition toward a target value;

introducing water into the stream in accordance with the continuing analysis of psychrometric conditions to urge at least one thereof toward the target value; and wherein the downstream psychrometric conditions is monitored by a relative humidity sensor which varies in electrical resistance in accordance with variations in relative humidity;

the downstream psychrometric conditions are analyzed by an analog circuit; and providing an air permeable water evaporation pad extending across the stream of air downstream of the point of water introduction into the stream, and upstream of the downstream psychrometric condition sensor.

14. The air conditioning method of claim 13, wherein:

the psychrometric condition target value is a temperature level of the downstream air.

15. The air conditioning method of claim 13, wherein:

the psychrometric condition target value is a relative humidity level of the downstream air.

16. Apparatus for conditioning a moving stream of air, comprising:

duct means for directing the stream of air to be conditioned;

means for introducing water into the stream;

at least one signal producing psychrometric sensor downstream of the water introducing means, for continuously monitoring the psychrometric conditions within the stream;

means to continuously analyze the monitor psychrometric conditions to determine whether to add water to the stream to urge psychrometric conditions therein towards a target value;

means commanding the water introduction means to introduce water into the stream in accordance with the continuing analysis of psychrometric conditions to urge said conditions toward said target value; and wherein the downstream psychrometric conditions is monitored by a relative humidity sensor which varies in electrical resistance in accordance with variations in relative humidity;

the downstream psychrometric conditions are analyzed by an analog logic circuit; and an air permeable water evaporation pad is provided extending across the duct downstream of the point of water introduction into the stream and upstream of any downstream psychrometric condition sensor.

17. The air conditioning apparatus of claim 16, wherein:

the psychrometric condition target value is a temperature level of the downstream air.

18. The air conditioning apparatus of claim 16, wherein:

the psychrometric condition target value is a relative humidity level of the downstream air.

* * * * *